United States Patent [19]
Akke

[11] 3,759,011
[45] Sept. 18, 1973

[54] PACKAGING MACHINE FOR PACKAGING UNIFORM ARTICLES SUCH AS PHARMACEUTICAL TABLETS

[75] Inventor: Vambola Akke, Hackensack, N.J.
[73] Assignee: Reed-Lane, Inc., Hackensack, N.J.
[22] Filed: May 4, 1972
[21] Appl. No.: 250,383

[52] U.S. Cl. .................................. 53/184, 221/273
[51] Int. Cl. ............................................ B65b 47/10
[58] Field of Search ................ 53/180, 184; 221/93, 221/95, 175, 176, 268, 270, 272–276

[56] References Cited
UNITED STATES PATENTS

| | | | |
|---|---|---|---|
| 2,490,781 | 12/1949 | Cloud | 53/184 X |
| 2,775,081 | 12/1956 | Stirn et al. | 53/184 X |
| 3,105,609 | 10/1963 | Salfisberg | 221/273 X |
| 3,290,860 | 12/1966 | Rau | 53/184 |

*Primary Examiner*—Robert L. Spruill
*Attorney*—Henry W. Foulds, Jr.

[57] ABSTRACT

A machine for packaging articles of uniform size, such as pharmaceutical tablets, in a blister type package utilizing laminating rolls to form the package from a pair of webs of indefinite length and an article feeding device for positioning the articles between the two webs as they lead to the nip between the laminating rolls. The article feeding device is in the form of a generally vertical chute which at its lower end curves about the surface of one of the laminating rolls overlying the web passing over such roll. The roll itself contains a die cavity which passes beneath the curved lower portion of the chute, and the web prior to passing beneath the chute is deformed into the die cavity such that a pocket, i.e., a blister, is formed in the web as it passes beneath the chute. The lower end of the chute is terminated in a lateral passageway approximately perpendicular to the passageway through the chute, and a plunger is provided to transfer an article from the bottom of the chute through such lateral passageway into the pocket. The web with the pocket containing the tablet or other article is then immediately positioned against the other web at the nip of the laminating rolls and the two webs are caused to adhere by pressure, and heat or the application of adhesive to one of the webs.

1 Claim, 3 Drawing Figures

PACKAGING MACHINE FOR PACKAGING UNIFORM ARTICLES SUCH AS PHARMACEUTICAL TABLETS

This invention relates to packaging of articles of uniform size, such as pharmaceutical tablets in the familiar "blister" package and in particular provides an apparatus for delivering such articles to the nip of a pair of laminating rolls for insertion of the articles, one at a time, between a pair of webs which when laminated and die cut into discrete units constitute the package in which the article is retained until it is to be used.

Conventionally blister packages have been constructed in a discontinuous manner. Typically, a sheet of thin, usually transparent and thermoplastic material is pressed, for example, by vacuum forming to form the blister or blisters, i.e., depressions, in the sheet which are sized to retain the article or articles. The blisters are then filled with the articles, usually one per blister, and then a second sheet usually of opaque material is adhesively bonded to the first, typically by heat sealing or in the application of adhesive material, thus sealing the articles between the two sheets. The laminated sheets may then be die cut to separate the discrete unit-packages. In this type of construction the blisters are usually sized to fit the article closely.

A similar type package is formed in a continuous manner by passing a pair of webs of indefinite length of usually transparent, thin material between a pair of laminating rolls. The laminating rolls contain die cavities which come into register as they pass through the nip of the laminating rolls, and an article feed is directed to the nip of the rolls to feed articles by gravity one at a time in synchronism with the closing of the die cavities, such that, as the die cavities pass through the nip, the two webs of material have the article positioned between them. In this type of machine the two webs of material are caused to adhere, for example by application of heat where a thermoplastic material is used, at the location of the nip of the rolls by heating one or both of the rolls. In such an arrangement the article feed device is a chute which is adapted to allow the articles to fall by gravity one at a time by means of a pin which obstructs the chute retaining a supply of articles stacked above, one on the other. The pin is timed to be removed and rapidly inserted in the chute, such that a single article falls into the pocket between the two webs formed by the closing die cavities at the nip of the laminating rolls. In this arrangement the die cavities are substantially larger than the article to be received between them.

It is a primary object of the present invention to provide a tableting machine which is a continuous manner can be operated to package uniformly sized articles in blister type packages.

It is also an important object of the present invention to provide such a continuous packaging machine in which the article feed system is designed rapidly to insert the articles one at a time into preformed blisters sized to receive the article closely.

It is also an important object to design such an article feed apparatus such that a plurality of such apparatus can be arranged side by side closely to enable insertion of a number of articles one at a time into separate, preformed blisters.

In accordance with these and other objects of the invention, which will become more apparent hereinafter, there is provided a machine or packaging articles of uniform size, such as pharmaceutical tablets, in a blister type package utilizing laminating rolls to form the package from a pair of webs of indefinite length and utilizing an article feeding device for positioning the articles, one at a time, or a plurality of such article feeding devices for positioning a plurality of articles at the same time, between the two webs as the two webs are led to the nip between the laminating rolls.

The article feeding device is in the form of a generally vertical chute which at its lower end curves about the surface of one of the laminating rolls overlying the web passing over such roll. The roll itself contains a die cavity which passes beneath the curved lower portion of the chute and the web. Prior to passing beneath the chute, the web is deformed into the die cavity such that a pocket, i.e., blister, is formed in the web as it passes beneath the chute. The lower end of the chute is terminated in a lateral passageway approximately perpendicular to the passageway through the chute, and a plunger is provided to transfer an article from the bottom of the chute through such lateral passageway into the pocket or blister.

The web with the pocket containing the tablet or other article is then immediately positioned against the other web at the nip of the laminating rolls and the two webs are caused to adhere by pressure and heat or by the application of adhesive to one of the webs.

In a preferred aspect of the invention the blisters are formed utilizing a sheet (web of indefinite length) of thermoplastic material on the one of the laminating rolls in which the blisters are formed. In this arrangement the thermoplastic web is carried through a large arc of the surface of rotation of the laminating roll. During the first portion of such arc heat is applied to the exposed side of the web of thermoplastic material to soften it, such that it can be deformed by vacuum forming. In the next portion of the surface of rotation the die cavity, which underlies the sheet and is intended to receive the article, is evacuated to deform the softened thermoplastic material into the die cavity forming a pocket. This pocket (blister) is then carried beneath the end of the article feed chute to receive the article.

In this arrangement the cylinder or laminating roll carrying the die cavity is cooled, for example by internal circulation of water. Thus, as the web of material is drawn across the die cavity and comes in contact with the cooled laminating roll, it is cooled rapidly to insure permanent formation of the blister. Another result of such internal cooling of the laminating roll is that the external application of heat by which the thermoplastic web is softened, is prevented from softening those portions of the web which contact the laminating roll; thus the only softened portion of the web is that which overlies the die cavity and is out of contact with the laminating roll. By the time the deformed pocket is positioned beneath the chute for receiving the article, such deformation has been partially set by cooling.

In this aspect the preferred manner of adhesively bonding the two webs as they come together in the nip is heat sealing. To this end the other laminating roll is internally heated. As it is in contact with the other web it is preferred the other web be of heat conductive material such as metal foil, thus the thermoplastic web is heated rapidly where it is forced into contact with the metal foil in the nip of the laminating rolls, except where the thermoplastic is deformed into the die cavities, such that heat sealing by softening of the thermoplastic occurs when the heat pressure of the laminating rolls forces the two sheets together.

For a more complete understanding of the practical application of this invention, reference is made to the appended drawings in which.

Figure 1:
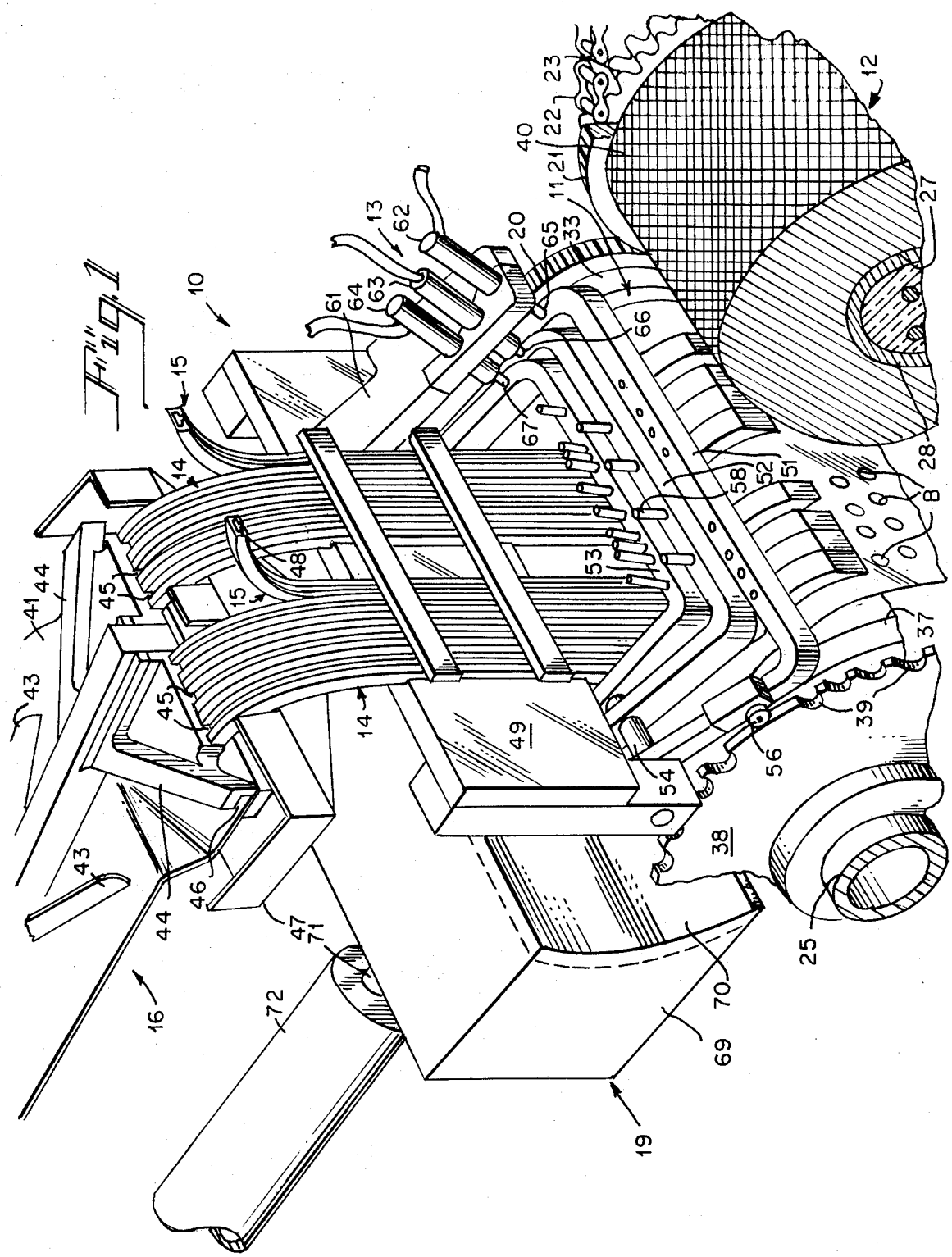
FIG. 1 is a perspective view of a packaging machine in accordance with the present invention generally eliminating conventional apparatus such as feed devices for the webs to be laminated, feed devices for the article leading to the article feeding device and drive mechanism.

Referring to the drawings and particularly to FIG. 1, the reference numeral 10 designates a packaging machine which includes a pair of laminating rolls 11 and 12, an article feed apparatus 13, including six feed devices 14 and two feed devices 15 arranged in parallel for simultaneous operation, a vibratory feeder 16 for delivering articles to feed devices 14, and a similar vibratory feeder (not shown) for delivering articles to feed devices 15. Apparatus 10 further includes a thermoplastic web feed arrangement including a sheave 17 for delivering a web P of thermoplastic material, such as polyvinylchloride, to laminating roll 11. Apparatus 10 similarly includes a feed arrangement including a sheave 18 for delivering a web F of material, such as aluminium foil, to the nip between rolls 11 and 12 in ontact with roll 12. In addition apparatus 10 includes a heater 19 for heating web P of thermoplastic material as it travels about roll 11 and a drive mechanism including meshing gears 20 and 21, respectively attached to rotate with rolls 11 and 12 at their ends (to the left as seen in FIG. 1). The drive mechanism further includes a roller link chain 22 riding on a sprocket 23 affixed to roll 12 adjacent gear 21 with chain 22 received by sprocket 23 to rotate roll 12 counterclockwise, and hence roll 11 clockwise (as seen in FIG's. 1, 2 and 3). Chain 22 is driven by any suitable drive (not shown) and usefully can be driven in synchronism with continuous printers located along the line of feed of web F of metallic foil, such that directions and other indicia can be printed on the foil in a continuous operation along with the laminating operation.

THE LAMINATING ROLLS

Referring also to FIG's. 2 and 3 laminating roll 11 is constructed of a solid block of steel in the form of a right cylinder with axial projections forming hubs 25 on which cylinder 11 is mounted for rotation about a horizontal axis. An axial bore 26 extends through roll 11 and hubs 25 to permit rotary connection to a water circulating system (not shown) for flowing cooling water through bore 26.

Laminating roll 12 is similarly constructed and provided with a central bore 27, and is also mounted for rotation about a horizontal axis, such that gears 20 and 21 mesh and such that the clearance at the nip between the confronting rolls is less than the combined thickness of the webs P and F of thermoplastic material and metal foil to be laminated. A heating element 28, typically a steel-cased tubular heating element, is inserted from one end into bore 27, such that roll 12 can be heated. Preferably the fit of element 28 in bore 27 is sliding such that element 28 can conveniently be secured in a fixed position.

The surface of roll 11 is provided with die cavities 30 which are positioned at intervals across the cylindrical surface of roll 11 and in arcuate intervals about it, such that they are disposed in circumferential groups about the surface of roll 11 and along parallel lines running in an axial direction. Preferably the arcuate spacings of die cavities 30 are equal except where a break occurs between a desired final discrete package and the next. The spacings of the die cavities across the length of roll 11 can be set as desired for aesthetic reasons and in consideration of the number of packages to be simultaneously filled. These spacings are limited only by the dimensions of feed devices 14 and 15.

Roll 11 is provided with a plurality of bores 31 extending parallel to the axis of roll 11 and disposed at arcuate intervals about roll 11 corresponding in number to the largest number of die cavities 30 in any circumferential group. Bores 31 extend through roll 11, each such bore being positioned underlying one lengthwise row of die cavities 30. Each die cavity 30 is connected by three bores 32 to bore 31.

Roll 11, referring more particularly to FIG. 1, carries a brass plate 33 rotatably mounted on hub 25 (at the right-hand end as seen in FIG. 1) between roll 11 and gear 20. Plate 33 has the same diameter as the main portion of roll 11 and fits in tight sliding fit against such right-hand end. Plate 33 (as hown in dashed lines in FIG. 2) is provided with an arcuate recess 34 in its side facing the end of roll 11, positioned to intercept the path of rotation of the ends of bores 31 at that end of roll 11. Recess 34 is accessible from the periphery of plate 33 by means of a bore 35 from the periphery of plate 33 to the inside face of recess 34. A tube 36 is mounted slidably in bore 35 and is anchored against fixed structure such that tube 36 prevents plate 33 from rotating and thus holds recess 34 in fixed position along the path of rotation of the ends of bores 31. Tube 36, at its end remote from plate 33, is connected to a vacuum line.

At its other end (left in FIG. 1) roll 11 is similarly capped by a brass plate 37. Plate 37 is fixed firmly on hub 25 against the end of roll 11, has the same diameter as roll 11 and functions to close the ends of bores 31 (at the left as seen in FIG. 1). If more access to vacuum is found necessary, plate 37 can be replaced by an arrangement similar to plate 33.

As also seen in FIG. 1 hub 25 at the left-hand end of roll 11 carries a cam plate 38, which is fixed to hub 25 such that it rotates with roll 11, for example by keying to hub 25. The periphery of cam plate 38 is provided with a series of notches 39, which correspond in number and arcuate spacing to the circumferential group of cavities 30 having the greatest number.

Roll 12 has a knurled surface, as indicated by the reference numeral 40.

ARTICLE FEED APPARATUS

Article feed apparatus 13, as indicated above, basically includes feed devices 14 and 15 and vibratory feeders. Vibratory feeder 16 and the similar feeder (not shown) for feeding devices 15 are conventional vibratory feeder trays in which rapid vibratory movement of the tray carries articles T, such as pharmaceutical tablets, from one end of the tray beneath a hopper to the other end of the tray. As shown in FIG. 1, feeder 16 has a tray 41 leading from the bottom of a conical hopper (not shown) located at its left end to the upper ends of feed devices 14 at its other end. Tray 41 is constructed with a central inverted channel 42 with its sides sloping inwardly toward channel 42, except at its left end (as seen in FIG. 1) where the sides of tray 41 slope away from channel 42. A pair of blades 43 are mounted on channel 42 spaced above the surface of tray 41 sufficiently to pass a single layer of articles T. By reason of the slope of tray 41 as the articles are passing along its length and under blades 43 they gravitate toward the center of tray 41 along channel 42.

At the end of tray 41, adjacent feed devices 14, channel 42 carries a pair of guide plates 44, which are located over the outwardly sloping portion of tray 41 and angled such that as tablets strike guide plates 43 they travel outwardly against it. Guide plates 43 have their undersides slotted, as indicated by the reference numeral 45, corresponding in location to the upper ends of feed devices 14. The angled forward edge of plates 44 is recessed, as indicated at 46, along its underedge a thickness to receive the articles being delivered by feeder 16. Slots 45 lead forwardly and enter into channel 46 where they terminate; thus as articles are fed along tray 41 and ride against guide plate 44 they also ride in recess 46 and fill in the slots 45 which are not theretofore filled, thus insuring a steady supply of articles to feed devices 14. Those articles which are not required to fill slots 45 as they move along the edge of guide plate 44 fall off the outer edge of tray 41 and are collected in a hopper 47 for recycling. The vibratory feeder feeding feed devices 15 is similarly arranged except that where three slots 45 are required in each plate 44 to correspond with the number of feed devices 14 only one slot 45 is required in each of plates 44 feeding devices 15.

Feed devices 14 and 15 are in the form of chutes which are disposed to receive articles T at their upper ends exiting slots 45 and allow them to drop to the position where they are inserted in the blisters B. Each device 14 is constructed of a rectangular stainless steel bar carryin a T-slot 48 running from the upper end of the device 14 and 15 to a point a short distance from its lower end. Feed devices 14 and 15 are curved at their upper ends to a position tangential to the horizontal and have long, parallel vertical sections at which the feed devices 14 and 15 are mounted to fixed structure, indicated by the reference numeral 49, such that T-slots 48 register with slots 45.

T-slots 48 are of a size just receiving the articles T to be packaged, such that articles T can slide down slots 48, one resting on top of the other. The open portion of each slot 48 is narrow enough to prevent articles T from falling out of feed devices 14 and 15 and yet is wide enough to admit stop pins and the like where it is desired to prevent flow in a particular device or in all the devices, as described more fully here below.

It will be apparent from the arrangement described that feed devices 14 are intended to receive one kind of article T and feed devices 15 another. It will also be noted that the feed devices are arranged with a group of three devices 14 and one device 15 closely adjacent and with a second group similarly arranged, but spaced from the first. Since feed devices are constructed of narrow steel bars, this spacing can be brought quite close in order to provide a neat and compact finished discrete packaged unit.

Figure 2:
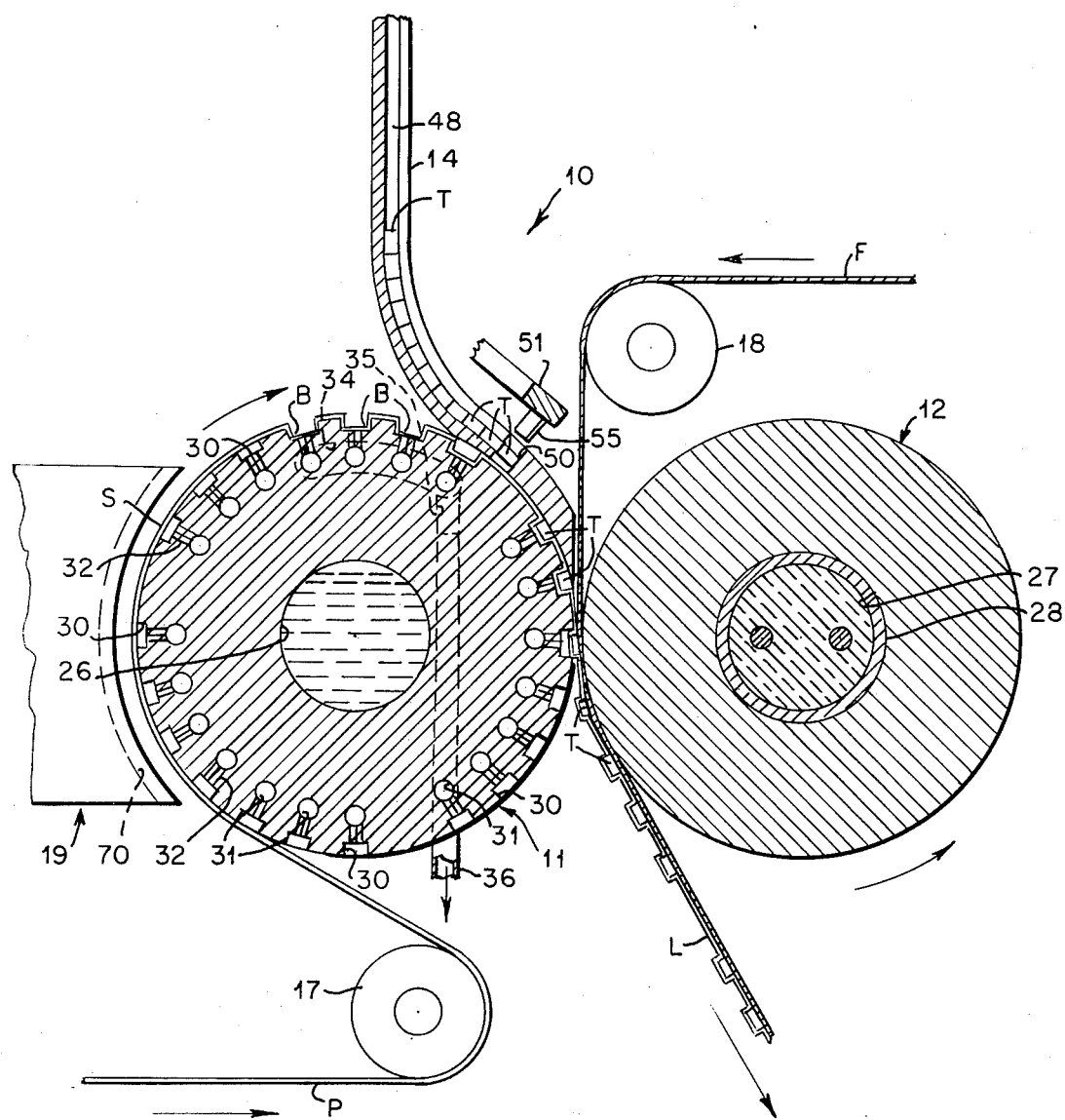
FIG. 2 is a vertical section through the apparatus shown in FIG. 1 illustrating one stage in the article feed and illustrating formation of the blister and laminated webs.

At their lower ends, as seen better in FIG. 2, feed devices 14 (and similarly feed devices 15) are bent to a curved shape conforming with the curvature of laminating roll 11 and are positioned adjacent the upper surface of roll 11 leaving just sufficient space for the passage of thermoplastic web P between roll 11 and the lower ends of feed devices 14 and 15. T-slots 48 terminate in such curved portion such that solid steel bar curves on down below almost into the nip of rolls 11 and 12, as seen best in FIG's. 2 and 3. At such termination of T-slot 48 each feed device 14 and 15 is provided with a lateral aperture, i.e., passageway 50, having generally the cross-sectional dimensions of the article T to be packaged. Passageway 50 extends entirely through each feed device 14 and 15 from its outer side to the inner side along the surface of roll 11 and is located registering over the path of travel of a circumferential group of die cavities 30. Thus for each circumferential group of die cavities 30 there is an associated feed device 14 and 15. The lateral passageways 50, in order to simplify operation, are aligned lengthwise along laminating roll 11 for reasons that will become obvious.

In order to control the operation of feed devices 14 and 15, three U-shaped bars 51, 52 and 53 are pivotally mounted at their ends on an axle 54, mounted on structure 49 along a horizontal axis located behind feed devices 14 and 15 (as seen in FIG. 1). U-bar 53 is positioned inside of bar 52, which in turn is positioned inside of bar 51.

The base of bar 51 overlies apertures 50 and carries on its underside a plurality of plungers 55, one registering over each passageway 50 in feed devices 14 and 15. The oscillatory movement of bar 51 is such that plungers can be moved from a position withdrawn from passageways 50 to a position fully extended into them. The left side of U-bar 51 (as seen in FIG. 1) has mounted on it a cam follower 56 which is positioned to ride on the rim of cam plate 38, such that as cam follower 56 rides along the rim of plate 38, U-bar 51 oscillates downwardly with each notch 39 and plungers 55 are reciprocated from a position withdrawn from passages 50 to a position fully extended into passageways 50. As will be apparent, the positioning of cam follower 56 is adjusted such that such reciprocation occurs precisely as die cavities 30 pass beneath passageways 50.

Figure 3:
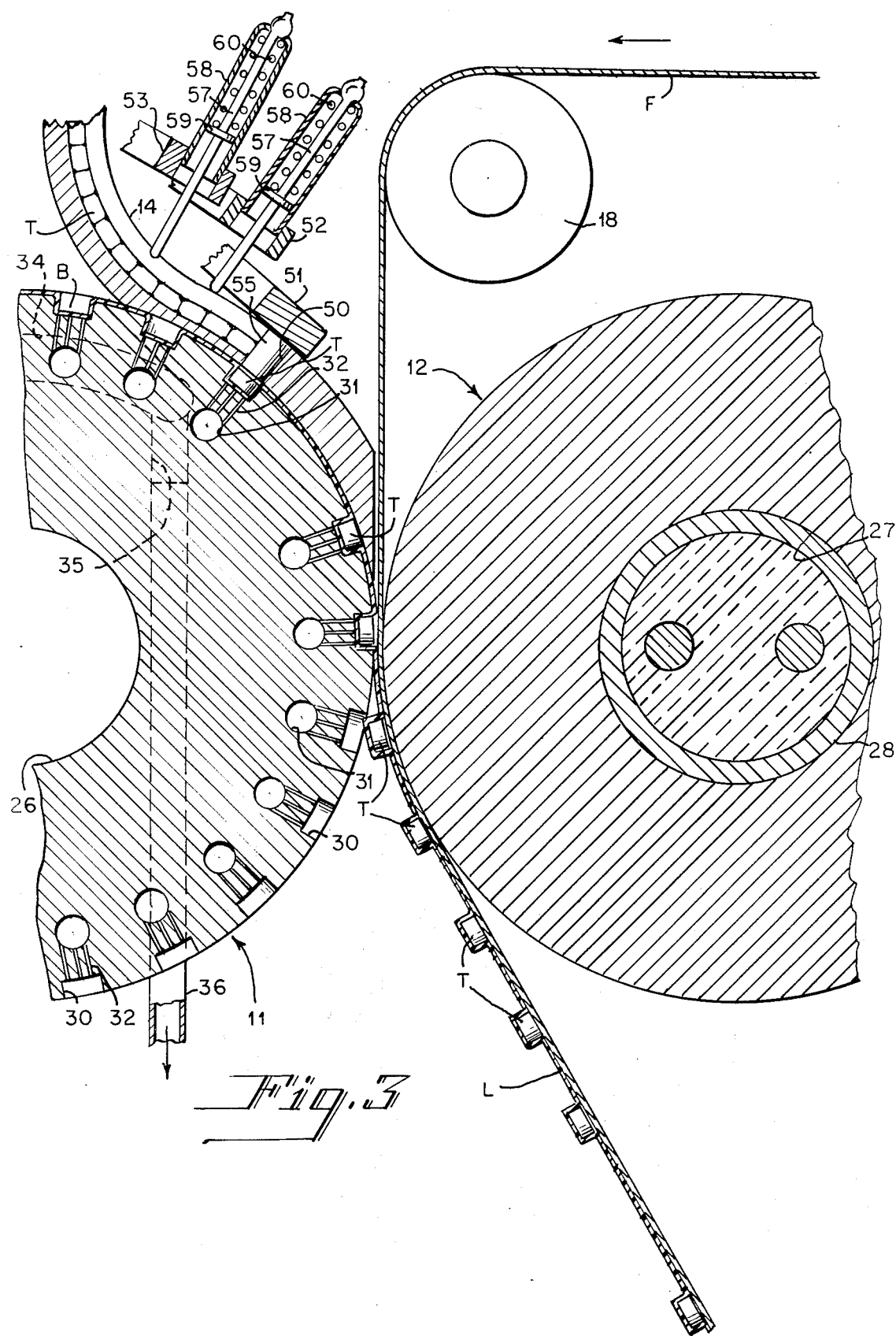
FIG. 3 is an enlarged fragmentary view similar to the view shown in FIG. 2 illustrating a second stage in the article feed.

U-bar 52 has its base extending over the ends of feed devices 14 and 15 immediately above (to the left in FIG. 3) U-bar 51. As can be seen in FIG. 3, U-bar 52 carries four spring-loaded pins 57, the ends of which project from the underside of U-bar 52. Pins 57 are mounted in tubular containers 58 affixed to the upper side of U-bar 52. Between the upper end of each tube 58, which is peened over, and a flange 59 on the middle of pin 57 there is located a small coil spring 60, which serves to bias pin 57 downwardly, such that the lower end of each pin 57 extends through U-bar 52 and projects below its underside. Two of the pins 57 are locates such that they ride on the outer surface of feed devices 14 and thus serve to hold the remaining two in inoperative position. The remaining two pins 57 on U-bar 52 are positioned such that when U-bar 52 is oscillated downwardly the ends of such pins 57 extend into the T-slot 48 of one of each group of feed devices 14.

U-bar 53 similarly carries a number of spring biased pins 57, the under ends of which extend below U-bar 53 and which are mounted on U-bar 53 in the same manner as described with respect to pins 57 on U-bar 52. In this case, however, there are ten pins 57; two are designed to ride on the upper surfaces of feed devices 14, one in each group, and the remaining eight are positioned such that their pins ride over T-slots 48, one associated with each feed device 14 and feed device 15. When U-bar 53 is oscillated downwardly such eight pins 57 project into T-slots 48 associated with the feed devices 14 and 15.

To the right of feed devices 14 and 15 (as seen in FIG. 1) an arm 61 is mounted on structure 49 overlying the right portions of U-bars 51, 52 and 53. Three air cylinders 62, 63 and 64 are mounted on arm 61 with their respective pistons 65, 66 and 67 positioned such that when actuated they bear downwardly on the right-hand portions of U-bars 51, 52 and 53, respectively. Cylinders 62, 63 and 64 contain internal springs which tend to retract pistons 65, 66 and 67 away from contact with U-bars 51, 52 and 53 when air pressure is removed from cylinders 62, 63 and 64. Cylinders 62, 63 and 64 are connected through suitable conduits and valving to a source of compressed air, such that when air pressure is applied their associated pistons 65, 66 and 67 are extended forcing U-bars 51, 52 and 53 downwardly.

Normally in operation cylinder 62 is always under pressure; thus it tends to provide resilient biasing urging follower 56 into contact with the rim of cam plate 38. Cylinder 63 is connected through valving which can be operated in synchronism with the operation of rolls 11 and 12 to cause its actuation at any selected point in the rotation of roll 11, to insert two pins 57 into their associated T-slots 48. When cylinder 63 is deactuated the other two pins 57 on U-bars 52 bias U-bar 52 back up to its normal position. Cylinder 64 is connected to the compressed air source through a manually operated valve so that it can be used to control the flow of articles through all feed devices 14 and 15, for example in start-up and shut-down of operation.

Heater 19 includes a housing 69 in which is placed a parti-cylindrical, ceramic electric heating element 70. Housing 69 is mounted at the end of a piston 71 of a double acting, air operated cylinder 72 which is mounted to fixed structure. Cylinder 72 is controlled by a four-way valve such that it can be operated to move heater 19 from a position removed from roll 11 to provide access to roll 11, to a position closely adjacent roll 11. Housing 69 is open on its side facing roll 11 and heating element 70 is mounted in such opening, such that when cylinder 72 is operated to position housing 69 adjacent roll 11 heating element 70 is closely spaced about the surface of roll 11. Configurationwise heating element 70 is positioned on the side of roll 11 remote from the nip between roll 11 and roll 12. Thus feed devices 14 and 15 feed down upon the upper surface of roll 11 after it has passed heater 70 and before it travels into the nip between rolls 11 and 12. It will be also observed, particularly with reference to FIG.'s. 2 and 3, that recess 34 connects die cavities 30 to the vacuum line as they have passed heating element 70 and prior to passing under lateral passageway 50.

It will be further noted, particularly with reference to FIG. 2, that sheave 17 is positioned such that the feed of thermoplastic web P is directed on to the surface of roll 11 prior to passing in front of heating element 70, and that position of sheave 18 is such that web F of metal foil is fed directly into the nip between rolls 11 and 12 without substantial prior contact with roll 12 or with thermoplastic web P on roll 11.

OPERATION

In operation initially web P of thermoplastic material, such as thin, transparent polyvinylchloride, is threaded around sheave 17 and roll 11 beneath the lower ends of feed devices 14 and 15 and through the nip between rolls 11 and 12. During this operation air cylinder 72 is operated to retract heater 19 to permit ready access to roll 11. Similarly a web F of aluminum foil or the like is fed over sheave 18 and brought through the nip between rolls 11 and 12 adjacent thermoplastic web P. Ordinarily the machine will be so arranged that the laminated product L which is intended to be produced will then be delivered to other devices for performing other operations, such as die cutting the resulant laminated product into discrete package units. The foil F and thermoplastic P, of course, cal also be fed through other apparatus, for example the foil F can be fed through printing units and the like prior to introduction to apparatus 10.

Feeder 16 for feeding articles T, such as pharmaceutical tablets, is then loaded, and vibratory feeder 16 is actuated to deliver tablets T to feed devices 14. The other feeder 16 is similarly operated to deliver tablets T to feed devices 15. Prior to initiating such feed, air cylinder 64 is actuated to emplace pins 57 into T-slots 48 such that as feeders 16 load feed devices 14 and 15, tablets T fall through T-slots 48 to the point where they are blocked by pins 57 and then stack up one upon another in T-slots 48.

The drive mechanism for rolls 11 and 12 and any other associated equipment, such as printing machinery and die cutting machinery, are then actuated. This operation causes roll 11 to rotate in a clockwise direction and roll 12 to rotate in a counterclockwise direction at the same speed. Cylinder 72 is then operated to bring heater element 70 into close proximity with the surface of web P, and heating element 70 is actuated. At the same time water circulation through bore 26 is initiated to cool roll 11, and heating element 28 in bore 27 of roll 12 is actuated to heat roll 12. The circulation of cooling water through bore 26 serves to withdraw heat from roll 11 which is applied to roll 11, both by heating element 70 and by indirect contact with roll 12 which is heated by element 28. Thus heating element 70 raises the temperature of thermoplastic web P primarily in the areas S passing before it which are out of contact with the surface of roll 11, that is those areas spanning die cavities 30. Consequently in such areas S the thermoplastic is softened. As roll 11 rotates carrying web P with it, web P leaves the position of heating element 70 and comes to the position at which bores 31 are connected to vacuum through recess 34. Consequently a vacuum is formed in die cavities 30 through bores 32 at a point when the portions S of web P overlying die cavities 30 are in a softened condition. This draws web P into die cavities 30 forming blisters B. It is important before blisters B pass beneath lateral passageway 50 in feed devices 14 and 15 that the blisters B be fully withdrawn into die cavities 30. If this is not the case plate 33 is rotated to move recess 34 in a counterclockwise direction.

As thermoplastic web P continues in passage beneath the ends of feed devices 14 and 15 into the nip between rolls 11 and 12 the chilling effect of the circulation of cooling water through bore 26 give blisters B a firm set, although they still may be warm, as they exit the nip. In the nip foil web F comes into contact with thermoplastic web P in all areas except those which lie in blisters B. Heat applied to heating element 28 raises the temperature of roll 12 to that which is adequate at the pressure and speed used to provide heat transfer through foil F sufficient to soften the adjacent surface of web P such that adhesion between web P and foil F occurs, thereby providing a laminated product L which is then drawn from the nip and led to such other operations as are required. The surface 40 of roll 12 is knurled in order to improve the appearance of the product by eliminating wrinkles in foil F.

When an inspection of the laminated product L shows that perfect blisters B are being formed and adequate sealing is obtained, air cylinder 64 is then deactuated to release pressure against U-bar 53 which is then withdrawn underneath the resilient biasing of the two pins 57 acting against the upper surfaces of feed devices 14 and 15. The flow of tablets T then extends down the chute in each feed device to a position where the lowermost tablet comes to rest in lateral passageway 50. The pressure of the weight of the tablets T stacked in each slot 48 above the lowermost tablet against the bottom of the passageway in slot 48 holds that tablet in position centered in passageway 50. This position is shown for example in FIG. 2. Air cylinder 62 is then pressured to cause U-bar 51 to rise down upon the rim of cam plate 38. As cam follower 56 next falls into a notch 39, U-bar 52 is oscillated down driving plungers 55 into lateral passageways 50 simultaneously with the passage of die cavities 30 in an aligned lengthwise row beneath lateral passageways 50 with a consequent forcing of the lowermost table T in each chute 48 into a blister B, as shown for example in FIG. 3. As can be seen in both FIG's. 2 and 3 the table T emplaced in a blister B is carried underneath the solid end portion of the feed device 14 or 15 right into the nip between rolls 11 and 12 so that it does not fall out.

At this point packaging apparatus 10 is producing a laminated product L containing the tablets T which is then suitable for such further processing as is required.

When a particular production run is terminated essentially the reverse process takes place, that is cylinder 64 is actuated and cylinder 62 is deactuated, then cylinder 72 is operated to withdraw heater 19 which is turned off and the operation is shut down.

As will be apparent the use of feed devices, such as feed devices 14 and 15, which can be feed from different sources admits to production of packages containing different mixtures of products and to the production simultaneously of different packages. Frequently it is desirable to package articles such as pharmaceutical tablets in a fixed number of dosage units, which fixed number is not evenly divisible by the number of feed devices available. In this case one of the feed devices, such as a feed device 14, can be rendered inoperative for a portion of the cycle of operation correspoding to a given package and a laminating roll 11 can be substituted which contains only the desired number of die cavities. For example there may be three circumferential rows of die cavities 30 relating to each discrete package unit to be produced in which each grouping around the roll 11 contains seven groups of die cavities in each discrete unit for the first two circumferential rows and only six in the third. In this arrangement U-bar 52 is actuated by pressuring cylinder 63 each time each discrete package is formed in the process, such that in seven actuations of U-bar 51 the seventh is blocked by the prior insertion of a pin 57 into the T-slots 48. If for example the location of pin 57 is one table T up the slot 48 from the location of passageway 50, U-bar 52 is actuated to stop the flow of tablets T in the particular feed device 14, one die cavity 30 ahead of the missing die cavity 30 on roll 11 and then released just after the row of die cavities 30 in which the missing die cavity 30 is located passes under passageway 50.

The claim:

1. In a packaging machine for packaging an article in a pocket between laminated webs including a pair of laminating rolls cooperating to form a nip therebetween, means counterrotating said rolls, means feeding a first web of indefinite length over a first of said rolls to said nip, means feeding a second web of indefinite length of deformable material over the second of said rolls to said nip, and means causing said webs to adhere as said webs are pressed together at said nip, the improvement which includes an article feeding device delivering articles to said nip, means deforming a portion of said second web into said second roll to form a pocket for receiving a said article, said deforming means including means defining a cavity in said second roll at a position underlying said second web as said second web passes over said second roll to said nip and means whereby said second web is deformed into said cavity, said article feeding device including a feed chute defining a passageway delivering a said article to said nip positioned above said second roll, said chute including a generally vertical passageway sized to receive a said article and allow such article to fall by gravity therethrough, the lower end of said passageway including a curved portion positioned adjacent the upper surface of a said second roll along the path, when said rolls are counter-rotated, travelled by said cavity as said cavity approaches said nip subsequent to the position at which said second web is deformed into said cavity, the lower end of said passageway being closed at the vicinity of said nip and said chute including a lateral passageway therethrough intersecting the lower end of said vertical passageway at a position between said position at which said portion of said web is deformed into said cavity and the position of said nip, said vertical passageway being sized to pass a said article, a plunger mounted for reciprocation between a first adjacent said lateral passageway on the side of said chute remote from said second roll and a second position extended through said lateral passageway, and means for reciprocating said plunger from said first to said second position in synchronism with the passage of said cavity adjacent said lateral passageway, whereby as a plurality of said articles are fed to the upper end of said vertical passageway, said articles fall to the lower end of said chute one article resting on the next lower article and with the lowermost article held in the lower end of said vertical passageway at the intersection of said lateral passageway held by the weight of the articles resting thereabove while said plunger is in the first position and said lowermost article is pushed into the deformed portion of said web as said plunger is reciprocated to said second position.

* * * * *

UNITED STATES PATENT OFFICE
CERTIFICATE OF CORRECTION

Patent No. 3,759,011      Dated September 18, 1973

Inventor(s) Vambola Akke

It is certified that error appears in the above-identified patent and that said Letters Patent are hereby corrected as shown below:

Column 1, line 21, after "or" delete "in"

Column 1, line 53, "is" should read --in--

Column 2, line 1, "or" should read --for--

Column 3, line 2, before "pressure" delete the word "heat"

Column 3, line 34, "on-" should read -- con- --

Column 4, line 32, "hown" should read --shown--

Column 5, line 45, "carryin" should read --carrying--

Column 6, line 45, "passages" should read --passageways--

Column 6, line 61, "locates" should read --located--

Column 8, line 21, "cal" should read --can--

UNITED STATES PATENT OFFICE
CERTIFICATE OF CORRECTION

Page 2

Patent No. 3,759,011                    Dated September 18, 1973

Inventor(s) Vambola Akke

It is certified that error appears in the above-identified patent and that said Letters Patent are hereby corrected as shown below:

Column 9, line 32, "rise" should read --ride--

Column 9, line 38, "table" should read --tablet--

Column 9, line 40, "table" should read --tablet--

Column 9, line 53, "feed" should read --fed--

Column 9, line 62, "correspoding" should read --corresponding--

Column 10, line 9, "table" should read --tablet--

Column 10, line 41, "counter-rotated" should read --counterrotated--

Column 10, line 51, after "first" insert --position--

Signed and sealed this 7th day of May 1974.

(SEAL)
Attest:

EDWARD M. FLETCHER, JR.
Attesting Officer

C. MARSHALL DANN
Commisioner of Patents